United States Patent [19]

Perkins

[11] Patent Number: 5,425,278

[45] Date of Patent: Jun. 20, 1995

[54] WEIGH SCALE WITH SAPPHIRE LOAD CELL

[75] Inventor: John D. Perkins, Candia, N.H.

[73] Assignee: Pneumatic Scale Corporation, Quincy, Mass.

[21] Appl. No.: 123,360

[22] Filed: Sep. 17, 1993

[51] Int. Cl.$^6$ .............................................. G01L 9/06
[52] U.S. Cl. ......................... 73/862.632; 73/862.634; 177/211
[58] Field of Search ............ 73/727, 862.632, 862.634, 73/862.637, 862.639; 338/2, 3, 4, 5, 6

[56] References Cited

U.S. PATENT DOCUMENTS

| | | | |
|---|---|---|---|
| 3,800,244 | 3/1974 | Kurtz et al. | 338/2 |
| 4,203,327 | 5/1980 | Singh | 73/727 |
| 4,373,397 | 2/1983 | Keller | 73/727 |
| 4,526,247 | 7/1985 | EerNisse et al. | 177/210 |
| 4,575,640 | 3/1986 | Krechmery | 73/721 |
| 4,774,843 | 10/1988 | Ghiselin et al. | 73/727 |

OTHER PUBLICATIONS

Hayashi et al., "Automatic recording quartz spring balance with an image sensor", *Rev. Sci. Instrum.*, vol. 52, No. 7, pp. 1064-1066 (Jul. 1981).

Naidu et al., "A Simple Autonull-type Servo-Controlled Electronic Balance for Thermogravimetric Applications", *Journal of Thermal Analysis*, vol. 16, pp. 381-388 (1979).

Saphikon, Inc., "Near-Net-Shape Crystal Production for Cost-Effective, High-Performance Sapphire".

LaBelle, H. E., Jr., "EFG The Invention and Application to Sapphire Growth", Reprinted from *Journal of Crystal Growth*, vol. 50, pp. 8-17 (Sep. 1980).

*Primary Examiner*—Richard E. Chilcot, Jr.
*Assistant Examiner*—R. Biegel
*Attorney, Agent, or Firm*—Robert M. Asher

[57] ABSTRACT

A load cell formed with a single crystal beam and strain gages deposited thereon. The single crystal beam may be advantageously formed from sapphire. The beam is arranged in the load cell with a fixed portion and a free portion to which weight forces may be applied. At least one strain gage is deposited on the beam to provide signals responsive to the applied weight forces. The method for making the load cell includes growing the crystal, depositing a strain sensitive layer on the crystal substrate, foxing the strain sensitive layer into at least one strain sensitive element and attaching a plurality of electrical leads to the strain sensitive elements to form strain gages. A weighing device is formed of a base upon which a plurality of the load beams are arranged for supporting a weigh platform.

11 Claims, 4 Drawing Sheets

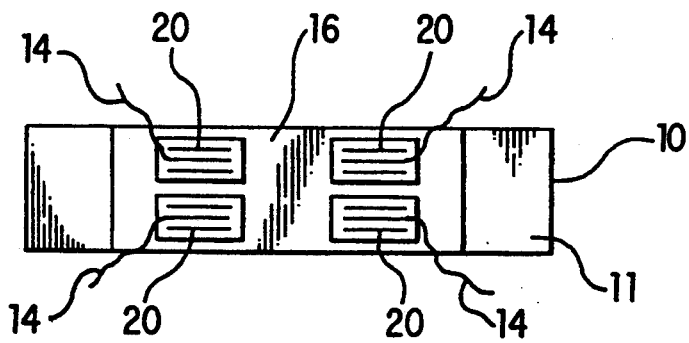
FIG. 1
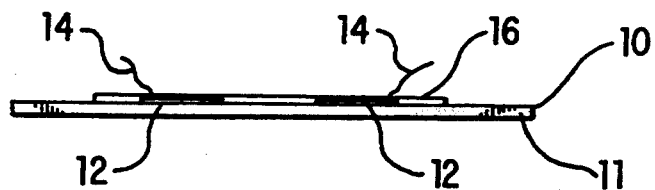
FIG. 2
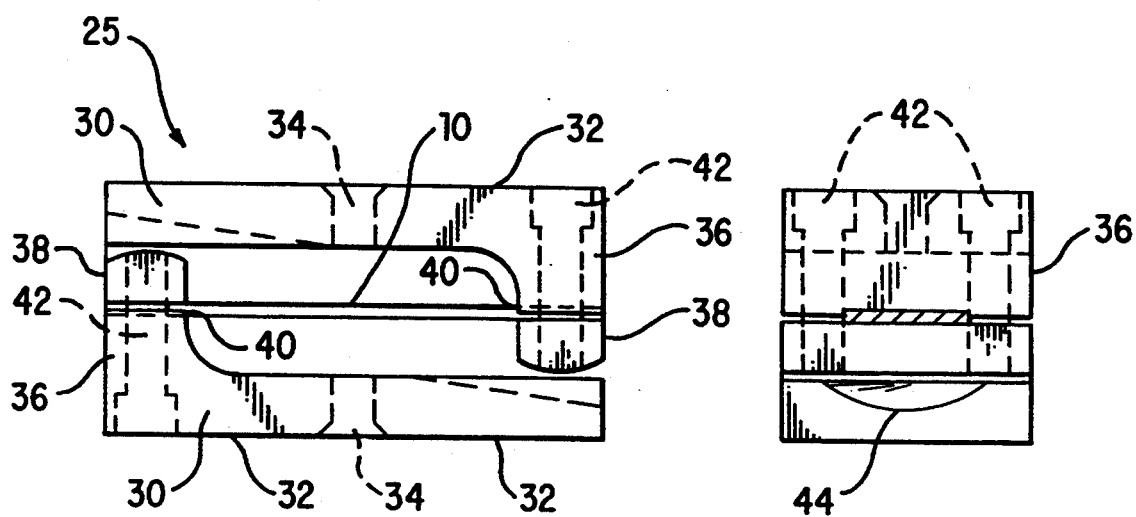
FIG. 3
FIG. 4

WEIGH SCALE WITH SAPPHIRE LOAD CELL

BACKGROUND OF THE INVENTION

The present invention is directed to a load cell, in particular, a load cell for use in a net weigh filler machine. The net weigh filler machine is a conventional packaging machine.

The scale assembly or load cell of a net weigh filler is one of the most critical components. The scale is preferably highly sensitive to applied weight but relatively insensitive to lateral forces. It is desirable that the sensitivity to weight remain constant even after repeated use. It is also desirable to provide the scale with protection against breakage and permanent deformation in the case of an overload.

A conventional scale in a net weigh filler has a platform mounted on a post a few inches above the load cell with a bottle retainer attached to the top. The height of this scale assembly poses a problem. The leverage due to the physical positions will tend to amplify any lateral forces on the weighing platform and increase the chance of load cell damage. The single load cell is subjected to complex tortional forces when a weight is placed off-center on the weighing platform. This causes load errors in the weight reading. The load cell in the conventional scale has reduced thickness areas where it flexes. The bending radius in these areas is relatively small. This decreases the sensitivity of the cell.

SUMMARY OF THE INVENTION

The present invention is directed to the use of a sapphire beam as the load beam in a weighing load cell. Sapphire is a single crystal nonconductive nonpiezoelectric material that provides significant advantages when used for this application. The load beam of the present invention is a sapphire beam with at least one strain gage deposited directly thereon. A passivation layer may be affixed over the strain gage to protect it from the environment.

A load cell of the present invention may be formed using a single crystal beam by fixing in position one portion of the crystal beam. The other portion of the beam is left free but guided. Force applied to the free portion of the beam is detected by the at least one strain gage deposited on the beam. The method of forming a load cell of the present invention uniquely involves the growth of a sapphire crystal as the flexible substrate, depositing a strain sensitive layer on the substrate and forming strain gages out of the strain sensitive layer.

The weigh scale of the present invention is provided with a fixed base and a plurality of cantilevered sapphire beams each having one end fixed to the base. A weigh platform is mounted so as to be supported by and float upon the opposite free ends of the cantilevered sapphire beams. Strain gages affixed to the sapphire beams provide signals indicative of the force on the weigh platform.

Sapphire makes an extraordinary material for use in a load cell. It is a single crystal material, therefore there is no possibility of crystalline movement. Crystal movement generates heat and fatigue in a polycrystalline material. If crystals do not return to their exact starting position, hysteresis results. The sapphire has a negligible coefficient of friction, a high temperature rating and low hysteresis. These characteristics provide for high repeatability of the signals produced by strain gages on the sapphire. Sapphire is a nonconductive material which advantageously permits the strain gage to be deposited directly on the sapphire without an insulation layer. Such conventional use of multiple layers has been known to reduce the repeatability of the results obtained by a load cell.

Other objects and advantages of the present invention will become apparent during the following description of the presently preferred embodiment of the invention taken in conjunction with the drawings.

BRIEF DESCRIPTION OF THE DRAWINGS

FIG. 1 is a plan view of a load beam of the present invention.

FIG. 2 is a side cross sectional view of a load beam of the present invention.

FIG. 3 is a side view of a load cell incorporating the load beam of FIG. 2.

FIG. 4 is an end view of the load cell of FIG. 3.

DETAILED DESCRIPTION OF THE PREFERRED EMBODIMENT

Figure 5:
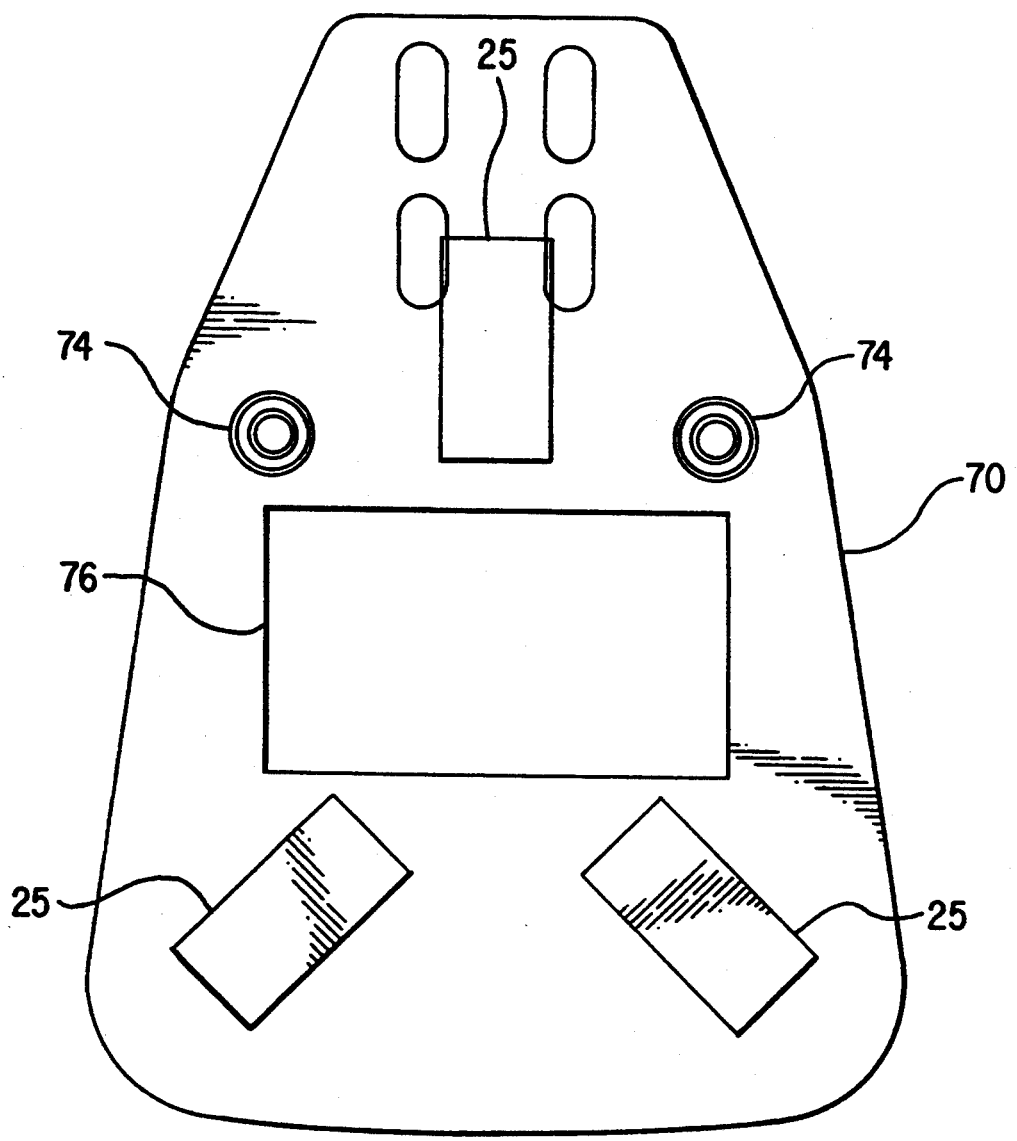
FIG. 5 is a schematic top view of the inside of a scale of the present invention.

Referring now to the drawings, a load beam 10 of the present invention is a rectangular beam of a single crystal nonpiezoelectric material. The preferred single crystal nonpiezoelectric material is sapphire. In order to obtain a consistent sapphire product it is preferred that the sapphire be formed using the EFG process (Edge-Defined Film-Fed Growth) taught in the article by H. E. LaBelle, Jr., entitle "EFG, The Invention and Application to Sapphire Growth", *Journal of Crystal Growth*, Vol. 50, September, 1980, pages 8–17. The size, shape and crystallographic orientation of the sapphire can be controlled. The material is grown from a molybdenum die placed in molten alumina. The pull rate and die control the size and shape of the finished sapphire ribbon. The seed crystal controls the crystal orientation. The sapphire in the load beam 10 is preferably oriented so that the C axis of the single sapphire crystal is oriented along the long portion of the crystal beam. The A axis is oriented perpendicular to the C axis across the width of the sapphire beam. The sapphire ribbon formed in the die is divided and machined to the desired dimensions. Specifically in one operation, the sapphire ribbon is polished on a diamond lap to the precise thickness desired. The presently preferred load beam is 0.035" thick in the M axis orientation. The length in the C axis is 1.5" and the width in the A axis is 0.35". The rectangular shape of the load beam makes it advantageously simple to machine. Polishing the sapphire ribbon advantageously provides a smooth surface for application of a sputtered strain gage. The sapphire is then annealed to remove any stresses from the artificial growth and polishing. One manufacturer of a sapphire ribbon according to these requirements is Saphikon of Milford, N.H.

A conventional method is used to deposit strain gages on the sapphire beam 11. Generally, strain gages are formed by first depositing an insulation layer. However, since the sapphire is nonconducting this insulation is not required. The first deposition is of a metallization layer 12. The electrical resistance of the metallization layer is sensitive to physical strain in either compression or tension on the sapphire beam. The metallization layer will be laser cut into the configuration of the strain gages and interconnecting arms. Four strain gages 20 are formed on the sapphire beam and then connected in a Wheatstone bridge circuit. The surrounding metallization is etched away to reduce the capacitive coupling to a frame attached to the beam. The presently preferred metallization layer is made of NICHROME nickel chromium alloy. Preferably, the thin film strain gages are deposited on the sapphire with a sputter deposition process. Sputter gages are deposited at about 400° C. in a vacuum and as a result they are molecularly bonded to the sapphire base material. Problems normally associated with the use of adhesives and strain gage backing are eliminated. Wire leads 14 are laser welded to the interconnecting arms. An insulating layer 16 is deposited on top of the strain gages. The insulating layer may be made of glass. The insulation protects the strain gages from environmental contamination.

The nonconductive sapphire physically and capacitively removes the strain gages 20 from electrical ground. This advantageously minimizes susceptibility of the strain gages to high frequency common mode noise from ground. Thin film gages are available in a wide range of materials with high gage factors and excellent thermal characteristics. The strain gages will be deposited over a relatively large area of the sapphire beam and be of adequate gage factor to output a high differential electrical voltage for a given strain. The strain gages 20 provide signals responsive to bending in either compression or tension of the sapphire beam 11. It is preferred that the output of the strain gages exceed two millivolts per volt full scale.

A load beam to be mounted in the frame of the load cell illustrated in FIGS. 3 and 4 should have a strain profile that is zero at the center with maximum strain at the ends where the sapphire is clamped to the frame. It is important that the edge of the frame where it meets the sapphire beam be left as sharp an edge as possible and that the electrical leads be bonded at the center of the sapphire assembly of the sapphire beam where the stress is zero. The arrangement of the leads on the sapphire load beam may be altered to accommodate different mounting arrangements such as that shown in the alternate embodiment of FIG. 8.

The use of a single crystal material in the load beam is highly advantageous because of the low hysteresis exhibited by such materials. The low hysteresis provides for more accurate and repeatable strain gage readings of the forces applied to the load beam. Sapphire is a particularly advantageous material for use in a load beam. Sapphire is ten times stiffer than aluminum and three times stiffer than steel. This enhanced stiffness raises the resonant frequency of a weigh scale incorporating the sapphire load beams. Thus the sapphire load beam is less susceptible to vibration frequencies which are easier to filter out. Sapphire is advantageously nonmagnetic, nonconductive and nonpiezoelectric. Its low coefficient of thermal expansion makes it less susceptible to changes due to heat. Sapphire has zero porosity. It is chemically inert and resistant to heat and abrasion.

Sapphire is immune to oxidation, airborne contaminants, cleaning solvents and disinfectants such as steam or bleach. The sapphire will not corrode which can otherwise change the mechanical properties. Furthermore, sapphire has a hardness value of 9 Mhos. The high hardness and high abrasion resistance insures a desirable level of mechanical stability Without the need for shielding. Sapphire may also be transparent which may have advantages in certain applications. It also exhibits virtually no creep. The Young's modulus of the sapphire load beam of the presently preferred embodiment is 60 million p.s.i. and the tensile strength is 450 thousand p.s.i.

Referring now to FIGS. 3 and 4, it is shown how the load beam can be mounted in a frame to form a load cell. A simple load cell 25 can be formed by identical upper and lower L-shaped frame members. Each frame member has a flat-bottomed plate 32 and a stumps 36 perpendicular to the plate. One member, the lower member 30 for example, may be fixed to a base of a scale by a screw or bolt extending through the base and into the flat bottomed plate 32 through a screw hole 34. The sapphire load beam 10 has an end portion fixed in position between the stump 36 and a cap member 38. The length of end portion fixed between the stump 36 and cap member 38 can be mechanically adjusted before bonding the load beam in place. The stress strain relationship exhibited by the load beam is proportional to the length of the beam available for flexing between its two clamped ends. An end portion of the load beam, in a presently preferred embodiment has a length of 0.25" inserted between the cap and the stump 36 of the L-shaped lower frame member 30. This portion of the sapphire load beam is lightly coated with epoxy and the cap tightened down upon the load beam prior to curing of the epoxy. The epoxy acts as a bedding compound and maintains even clamping on the ends of the sapphire load beam. The cap member 38 has a rounded top, the summit of which is used as an overload stop. The cap 38 has a length that exceeds the width of the sapphire load beam. On either side of the load beam, bolts 42 are screwed down to hold the cap 38 tightly against the frame member 30 so as to secure the load beam 10 in place. The inner edge 40 of the stump 36 is sharp and straight to improve the linearity and repeatability of the strain gage responses to forces applied normal to the load beam. The L-shaped lower frame member 30 is hollowed out in its center to form a trough 44 on top of the flat bottomed plate 32. The trough 44 has a curved bottom which becomes increasingly deeper towards the outer end of the frame member. The trough 44 encourages product to drain away from the load cell so as to prevent product accumulation which could jamb in the overload stop and affect the performance of the load beam assembly.

The free end of the load beam is secured in the upper L-shaped frame member 30 in the same manner. The upper and lower L-shaped frame members are duplicates of one another as are the upper and lower overload stops. This advantageously reduces the number of different components that need to be made. The stump 36 and the cap 38 are screwed together to hold the load beam 10 therebetween. The inner edge 40 of the stump 36 is preferably straight and sharp. This upper L-shaped frame member 30 is free to move up and down as weight is placed or removed therefrom. The frame members and caps are preferably made from hardened stainless steel.

Between the fixed end of the load beam and the free end of the load beam, the load beam has a cantilevered portion. When a force is applied to the upper frame member, the cantilevered portion of the sapphire load beam will flex into an "S" shape with a deflection proportional to the force. With a force applied to the center of the assembly, the upper and lower frame will remain parallel to each other. The strain gages on the sapphire load beam provides signals responsive to and proportional to the amount of force applied to the free end portion of the sapphire load beam by the upper frame member. If the force on the load cell goes beyond the maximum design in value, the overload caps will contact the outer corners of the opposite frame member. This will prevent any further strain on the sapphire load beam 10. The overload stops on the four corners will inhibit proportional stress on the load beam while in an overload condition. The gap for the overload stops, as presently preferred, should be approximately 0.20" which will maintain the maximum stress on the sapphire element at less that 15% of its ultimate strength.

A weighing scale of the present invention is schematically shown in FIG. 5. This is a pancake style scale suitable for use with the sapphire load cells. A plurality of load cells may be distributed about the scale. By using several load cells, off center load errors are avoided. Preferably, three load cells 25 are used to suspend a weigh platform 70. With three load cells, the scale platform can be balanced and will always be in contact with each load cell. The weigh platform need not be secured to the load cells. Rather the weigh platform floats on the cells. Force is applied on the load cells by the weight of items placed on the weigh platform. A pair of weigh platform retainers 74 keep the platform attached on top of the base 96.

The base is provided with space for an electronics assembly 76. It is presently preferred that the electronics provide a filtered 24 bit digital output. The circuitry may consist of a fixed gain instrumentation amplifier for each load cell, a summing amplifier and analog filter, a signal conditioning A/D converter and a digital filter. Parameters such as gain and filter response are programmable. The scale communicates with the controller of a weigh filler for example via a high speed serial data line. The leads from the sapphire load cells get connected to the electronics for providing signals to the weigh, filler controls corresponding to the force applied to the weigh platform. The electronic circuit board may preferably be held in place with screws but will also be bonded to the base with a thermally conductive silicon potting compound to aid in thermal stability of the electronics. Temperature compensation will probably not be required in such a scale but if desired it can be done electronically by adding a temperature sensor to the printed circuit board of the electronics assembly to allow the temperature to be monitored.

Figure 6:
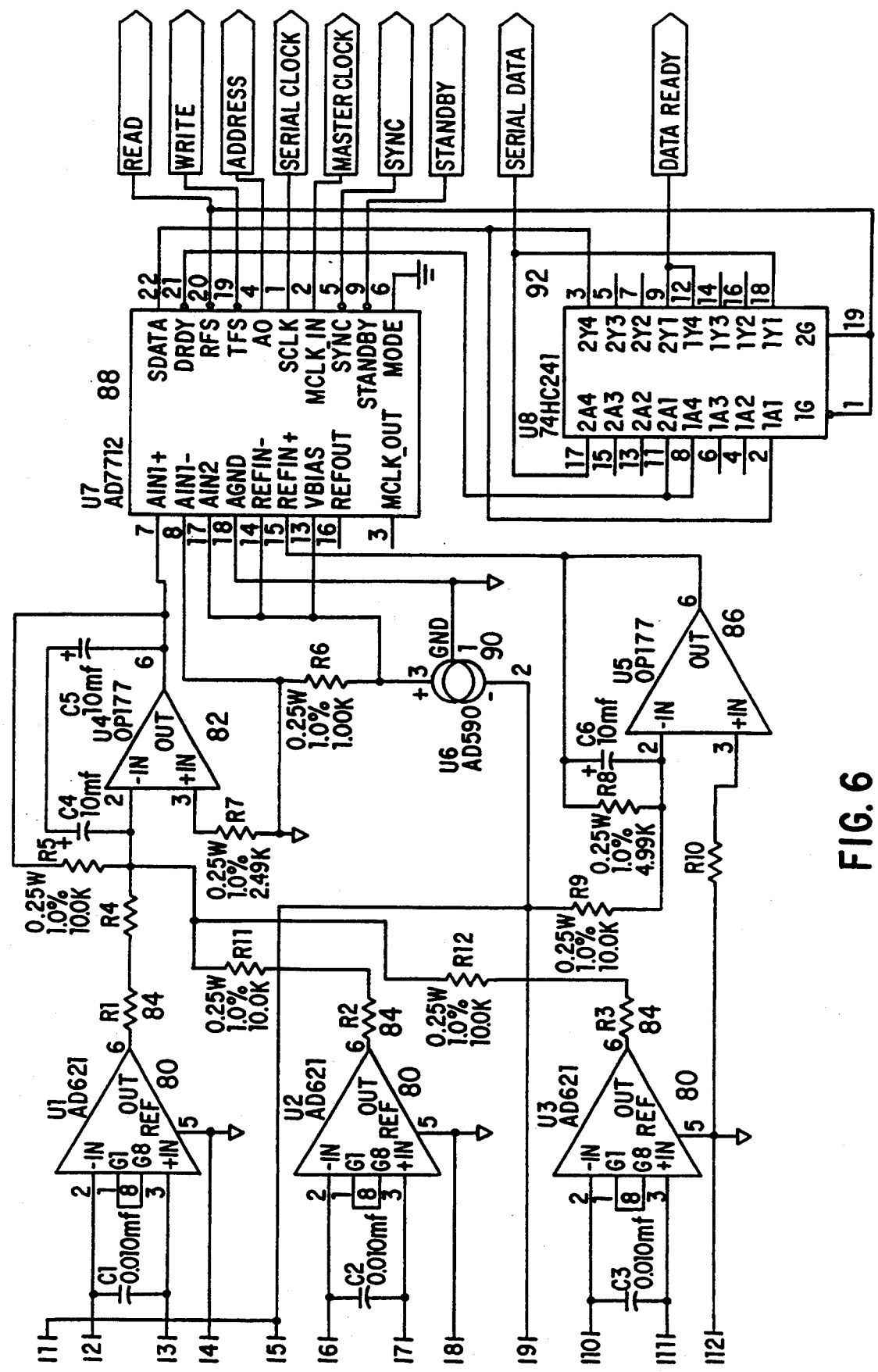
FIG. 6 is an electrical schematic of the electronic assembly for use in the scale of FIG. 5.

Referring now to FIG. 6, the circuitry will be described in greater detail. Each load cell feeds a differential instrumentation amplifier 80 with a preset gain. The presently preferred instrumentation amplifier is an Analog Devices AD621. The output of the differential amplifiers is summed in an operational amplifier 82. The summing amplifier 82 is also configured as an integrating amplifier. Between each of the instrumentation amplifiers and the summing amplifier is a trimmable calibration resistor 84. The calibration resistors for all three load cells may be equal or they may be trimmed in order to match the performance of the load cells to account for differences due to manufacturing tolerances.

A voltage converter 86 is connected to the supply voltage that supplies the strain gages. The voltage is proportionately reduced, by one-half for example, and fed to the signal conditioning A/D converter 88 as a reference voltage. The reference thus tracks the supply on the gages. The presently preferred voltage converter 86 is formed with an Analog Devices OP177 operational amplifier. Because the reference voltage to the A/D converter and the supply voltage to the strain gages track one another, the system is ratiometric. By implementing a ratiometric system, the need for precision references voltages is avoided. The presently preferred signal conditioning A/D converter 88 is an Analog Devices AD7712. This integrated circuit includes an input analog multiplexer, a programmable gain amplifier, a 24 bit Sigma Delta A/D converter and a digital controller. The signal conditioner can be connected to handle an additional input signal. For example, a temperature sensor 90 can be mounted on the circuit board. A multiplexor in the signal conditioner selects the input to be processed. The selected signal will be amplified and converted into a digital signal. Digital filtering reduces noise generated in the conversion process. The controller in the signal conditioner is programmable for selecting the input to process and for setting an appropriate filter response. The output from the signal conditioning A/D converter is fed through a line driver 92 at a data rate of 1.6 to 2 million bits per second.

Figure 7:
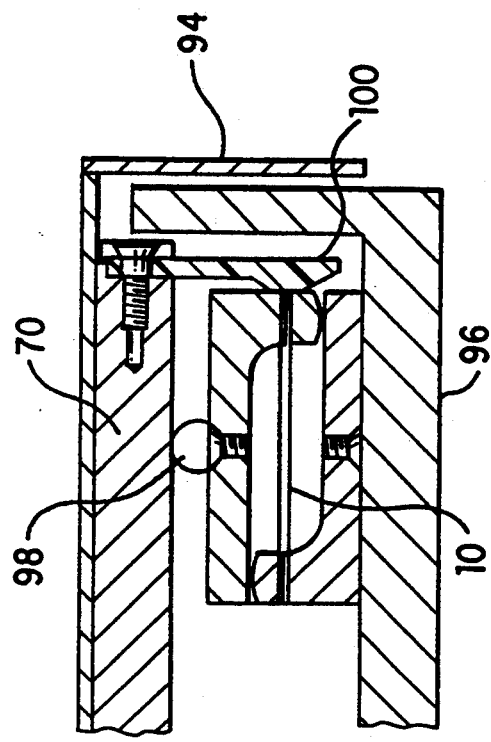
FIG. 7 is a partial side view in cross section of the scale of FIG. 5.

The weigh platform 70 is preferably an aluminum casting. A stainless steel pan may be attached to the top of the weigh platform for receiving items to be weighed. The weigh platform 70 may include a flange 94 about its perimeter disposed in a downward direction as shown in FIG. 7. A small space is left between the flange and the base 96 of the weighing scale. In the presently preferred embodiment, the spacing is about 2 mm. The flange limits rotational or lateral movement of the weigh platform with respect to the base. The weigh platform 70 rides or floats on a low friction support 98 mounted on the flat surface of the top L-shaped frame member 30. The low friction support 98 of the presently preferred embodiment is a sapphire ball. The ball is epoxied in place on the frame member. The sapphire ball provides a small, strong contact area with a very low coefficient of friction. The low friction contact minimizes transmission of lateral forces on the weigh platform to the load cells that would otherwise generate errors or damage. On one end of each load cell there is a retainer 100 that acts as a spring to hold the weigh platform centered so that the sides of the platform do not make contact with the base during normal operation. The presently preferred retainer 100 is made of a plastic, such as TEFLON. The end of the retainer touching the load cell makes contact in alignment with the end of the load beam so as not to impose detectable strains on the load beam in response to lateral forces on the weigh platform.

Figure 8:
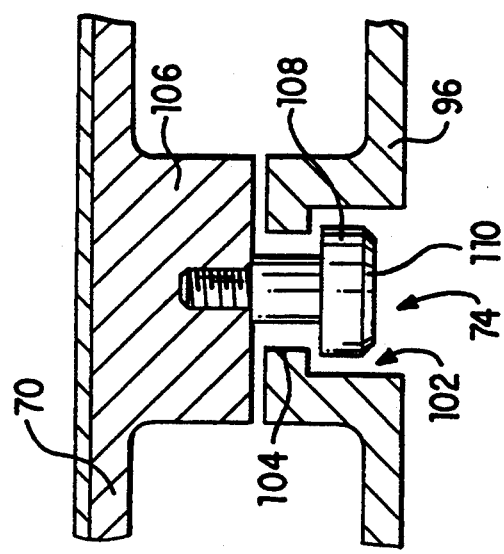
FIG. 8 is a cross sectional view of a platform retainer for use in the scale of FIG. 5.

In order to prevent the weigh platform 70 from being lifted off the base of the weigh scale unintentionally, the retainer 74 of FIG. 8 is used. A well 102 in the bottom of the base of the weigh scale is provided with a hole 104 therethrough. The weigh platform 70 is provided with a plateau 106 for receiving a shoulder bolt 108. The shoulder bolt 108 has an enlarged head 110 which travels up and down through the well 102. The shoulder bolt 108 is screwed in through the hole in the bottom of the well into the plateau 106 on the weigh platform. The enlarged head 110 of the shoulder bolt 108 engages the bottom of the well 102 should the weigh platform be lifted from the base. Thus the platform is prevented from being removed off the base. The plateau 106 of the weigh platform may also serve as an additional overload stop in conjunction with the bottom of the well 102 on the base. The flange 94 of the weigh platform limits rotational and lateral movement of the weigh platform and the retainer 74 of FIG. 8 prevents removal of the platform from the base. The weigh platform 70 is thus guided as it floats on the base 96 of the weigh scale. The weight of the weigh platform and anything thereon is supported by the sapphire load cells.

Figure 9:
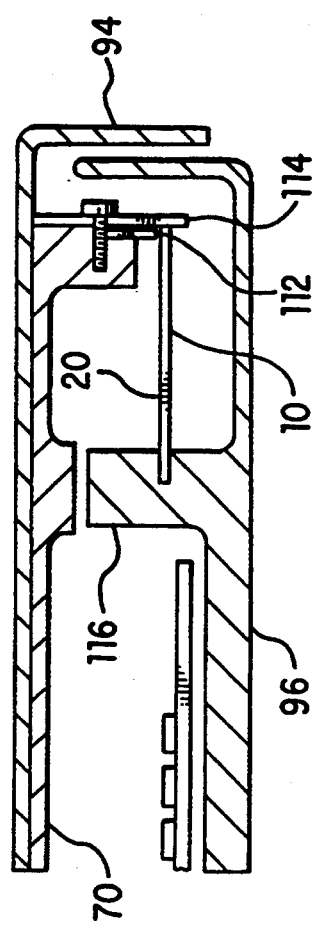
FIG. 9 is an alternate embodiment for mounting the load beam of the present invention for use in the scale of FIG. 5.

The sapphire load cells may be replaced by the alternate embodiment of FIG. 9. Here, the fixed portion of the sapphire load beam 10 is secured directly to a support member 116 in the base of the weigh scale. The load beam is thus cantilevered in suspension over a depression formed in the base. A foot 112 extends down from the weigh platform to contact the free end of the sapphire load beam. The foot 112 is preferably formed from sapphire. Thus a low friction, high wear point is achieved at the point of scale suspension. To assist further with the lateral positioning of the weigh platform, a retainer post 114 may extend down from the weigh platform. The retainer 114 is preferably made from a TEFLON or polybutadiene. The retainer should maintain the weighing platform in lateral position and return it to center without affecting the sapphire load cell operation. The support member 116 extending up from the base that is used to hold the sapphire load beam in position may also be used to form another overload stop with the weigh platform.

Of course, it should be understood that various changes and modifications to the preferred embodiments as described above will be apparent to those skilled in the art. For example, other single crystal nonconductive nonpiezoelectric materials such as beryl, single crystal silicon carbide and cubic zirconia might be substituted for the use of sapphire. Countless different supporting members may be arranged to cantilever the sapphire load beam for achieving a proportional weighing signal. The sapphire load beam can be used in a variety of devices to provide an electronic signal proportional to an applied force. These and other changes can be made without departing from the spirit and scope of the invention and without diminishing its attendant advantages. It is therefore intended that such changes and modifications be covered by the following claims.

I claim:

1. A method for making a load responsive member comprising the steps of:
   growing a sapphire crystal;
   machining the sapphire crystal into a substrate of predefined size;
   depositing a strain sensitive layer onto the substrate;
   forming the strain sensitive layer into at least one strain sensitive element; and
   attaching a plurality of electrical leads to the at least one strain sensitive element to form at least one strain gage.

2. The method of claim 1 further comprising the step of depositing a insulation layer onto said at least one strain gage.

3. The method of claim 1 wherein said step of forming comprises etching the strain sensitive layer.

4. A weighing device comprising:
   a base;
   at least one cantilevered sapphire beam, each of said at least one cantilevered sapphire beams having one end fixed to said base and an other end;
   a weigh platform mounted so as to be supported by the other ends of said at least one cantilevered sapphire beams; and
   at least one strain gage, each of said at least one strain gages being deposited on one of said at least one cantilevered sapphire beams for providing signals responsive to a force applied to said weigh platform.

5. The weighing device of claim 4 wherein each of said cantilevered sapphire beams is made of single crystal sapphire.

6. The weighing device of claim 5 wherein each of said sapphire beams includes a C axis oriented along a length of said sapphire beam extending between the one end and the other end.

7. The weighing device of claim 6 wherein each of said sapphire beams further includes an A axis oriented along a width of said sapphire beam perpendicular to the length.

8. The weighing device of claim 4 further comprising stop means, mounted between said weigh platform and said base, for mechanically limiting deflection of said at least one sapphire beam by a weight on said weigh platform to a predetermined maximum deflection.

9. The weighing device of claim 4 further comprising at least one sapphire rest member, each rest member mounted in attachment with the other end of one of said at least one cantilevered sapphire beams and wherein said weigh platform rests upon said at least one sapphire rest member.

10. The weighing device of claim 4 further comprising at least one retainer extending down from said weigh platform next to said at least one cantilevered sapphire beam, said at least one retainer serving to maintain said weight platform within lateral alignment with said at least one cantilevered sapphire beam.

11. The weighing device of claim 4 wherein said at least one cantilevered sapphire beam includes at least three cantilevered sapphire beams.

* * * * *